US012479238B2

(12) United States Patent
Bessac et al.

(10) Patent No.: US 12,479,238 B2
(45) Date of Patent: Nov. 25, 2025

(54) DEVICE FOR ASSEMBLING THE SPOKES OF A TIRE FOR A WHEEL BY MEANS OF PUSHERS THAT ARE ACTUATED AND ELASTICALLY SUSPENDED BY LEVERS

(71) Applicant: COMPAGNIE GENERALE DES ETABLISSEMENTS MICHELIN, Clermont-Ferrand (FR)

(72) Inventors: Christophe Bessac, Clermont-Ferrand (FR); Lucie Chevrel, Clermont-Ferrand (FR); Jean-Claude Delorme, Clermont-Ferrand (FR); Yorrick Bunge, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/710,507

(22) PCT Filed: Oct. 25, 2022

(86) PCT No.: PCT/FR2022/052018
§ 371 (c)(1),
(2) Date: May 15, 2024

(87) PCT Pub. No.: WO2023/084172
PCT Pub. Date: May 19, 2023

(65) Prior Publication Data
US 2025/0010660 A1  Jan. 9, 2025

(30) Foreign Application Priority Data
Nov. 15, 2021 (FR) ...................................... 2112030

(51) Int. Cl.
*B60B 31/00*       (2006.01)

(52) U.S. Cl.
CPC ................................ *B60B 31/005* (2013.01)

(58) Field of Classification Search
CPC ........... B60B 31/005; B60B 1/00; B60B 9/26; B29D 30/02
See application file for complete search history.

(56) References Cited

U.S. PATENT DOCUMENTS 9,278,494 B2   3/2016  Anderson et al.
11,597,234 B2  3/2023  Wilson et al.
(Continued)

FOREIGN PATENT DOCUMENTS

WO   2013/130047 A2   9/2013
WO   2018/125188 A1   7/2018
(Continued)

OTHER PUBLICATIONS

International Search Report dated Feb. 1, 2023, in corresponding PCT/FR2022/052018 (4 pages).

Primary Examiner — Moshe Wilensky
(74) Attorney, Agent, or Firm — VENABLE LLP

(57) ABSTRACT

A device for assembling an airless tire (2) comprising a hub (3) of central axis (Z3), a peripheral annular band (4) and a plurality of spokes (5) that connect the hub (3) to the peripheral annular band (4) comprises a plurality of pressing sub-assemblies (10) each comprising pushers (11, 12) for pressing the feet (6, 7) of the spokes (5) against the hub (3) and the peripheral annular band (4) respectively, as (20) and each hold a lever (15, 16) that makes it possible to transmit a clamping force (F15, F16) to the pusher (11, 12) while ensuring elastic radial suspension of the pusher (11, 12) vis-à-vis the traveller (13, 14) and therefore against the foot (6, 7) of the spoke and the hub (3) or the peripheral annular ring (4) well as travellers (13, 14) that are mounted radially movably under the control of a drive system respectively.

13 Claims, 3 Drawing Sheets

(56) References Cited

U.S. PATENT DOCUMENTS

| | | | |
|---|---|---|---|
| 11,926,114 | B2 | 3/2024 | Lung et al. |
| 2015/0017277 | A1 | 1/2015 | Anderson et al. |
| 2015/0210025 | A1 | 7/2015 | Martin |
| 2020/0276863 | A1 | 9/2020 | Wilson et al. |
| 2020/0376789 | A1 | 12/2020 | Lung et al. |
| 2025/0010661 | A1 | 1/2025 | Bessac et al. |

FOREIGN PATENT DOCUMENTS

| | | |
|---|---|---|
| WO | 2018/125190 A1 | 7/2018 |
| WO | 2019/103728 A1 | 5/2019 |

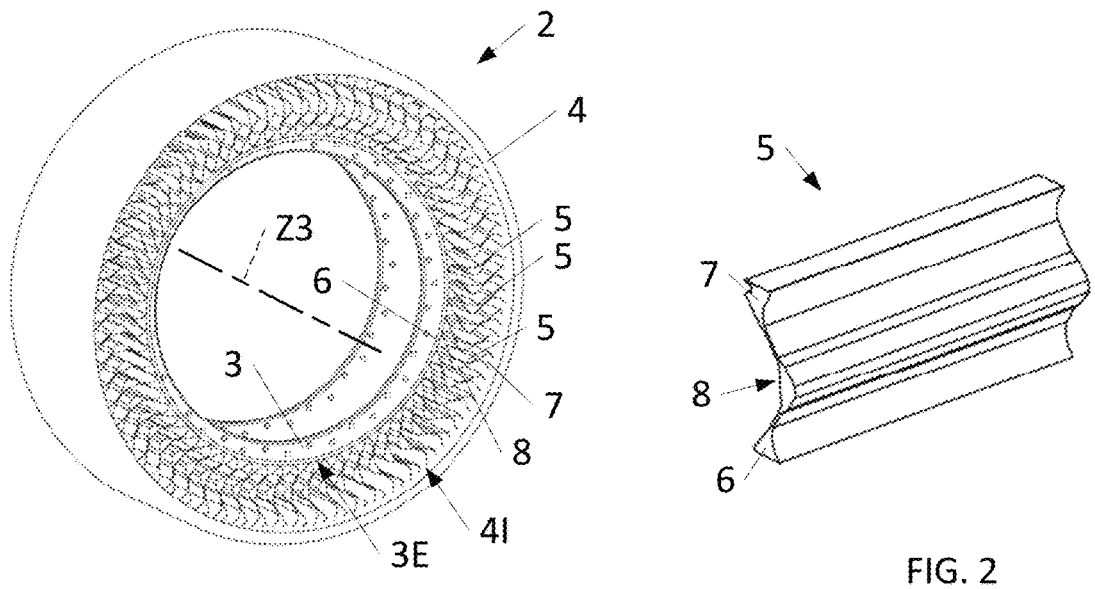
FIG. 1
FIG. 2
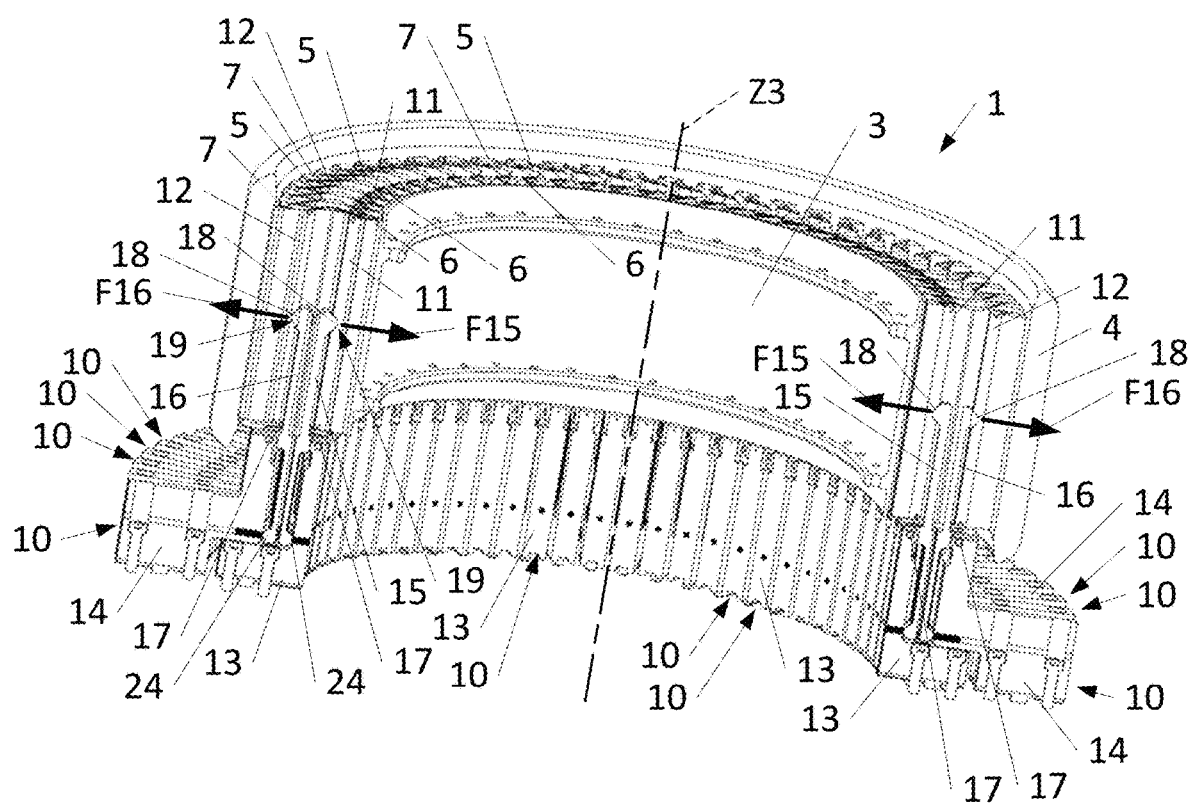
FIG. 3

DEVICE FOR ASSEMBLING THE SPOKES OF A TIRE FOR A WHEEL BY MEANS OF PUSHERS THAT ARE ACTUATED AND ELASTICALLY SUSPENDED BY LEVERS

BACKGROUND

The present invention relates to the field of manufacturing tyres for vehicle wheels, and more particularly manufacturing so-called "airless" tyres, in which a peripheral annular band comprising the tread is mechanically supported by a plurality of solid spokes that connect said peripheral annular band to a hub.

WO2019/103728 describes a tool that makes it possible to fasten the spokes simultaneously to the hub and the peripheral annular band, by pressing one foot of each of said spokes against said hub and the other foot of each of said spokes against the peripheral annular band, by means of pushers that are radially driven by annular inflatable membranes.

More specifically, in this known tool, all of the pushers that act in a centripetal radial direction to press the radially inner feet of the different spokes against the hub are driven simultaneously by a first set of two membranes, which comprises a lower membrane situated on the back of one of the axial ends of said pushers, and an upper membrane situated on the back of the other axial end of said pushers.

Likewise, all of the pushers that act in a centrifugal radial direction to press the radially outer feet of these same spokes against the peripheral annular band are driven simultaneously by a second set of two membranes that respectively engage against the back of the two opposite axial ends of said pushers.

Although such a tools is generally satisfactory, it can however have certain limitations.

In particular, such a tool can be relatively sensitive to any local variations in the friction exerted on the different pushers during the radial movements of said different pushers, or to variations in the individual mechanical behaviour of the different spokes in reaction to the inflation of the membrane and the corresponding action of the pushers, or to any uneven distribution of the inflation gas either within a single membrane or between two membranes of a single set of membranes.

Depending on the circumstances, it is possible for these factors to cause the jamming of the pushers by butting, or a slight positioning defect of some spokes, which can sometimes result in undesirable overlapping of the feet of two neighbouring spokes.

Further, the aforementioned factors can also cause a degree of non-uniformity, from one spoke to another, in the intensity of the radial compressive forces that press the different spokes against the hub or the peripheral annular band respectively, during the spoke bonding process. If the radial compressive force exerted during assembly is significantly insufficient, this can potentially lead to the appearance of a weak zone in the join between the foot of the spoke and the hub or the peripheral annular band respectively, and therefore to the scrapping of the tyre.

For all of these reasons, it can sometimes be difficult to obtain a completely uniform tyre at the end of the known assembly process, or to guarantee that said process is completely repeatable from one tyre to another.

In addition, the membranes can be subject to mechanical attack, in particular by abrasion, cutting or puncturing, which can in some cases limit the service life of the tool.

SUMMARY

The objects of the invention therefore aim to overcome the aforementioned drawbacks and propose a particularly robust and durable novel assembly tool that allows fast, repeatable, reliable and accurate manufacturing of airless tyres having a uniform structure of excellent quality.

The objects of the invention are achieved by means of an assembly device for manufacturing a tyre that comprises a hub having a central axis, a peripheral annular band coaxial with the hub, and a plurality of spokes that connect the hub to the peripheral annular band and to this end each comprise a first foot fastened on a radially outer face of said hub forming a first receiving face and a second foot fastened on a radially inner face of said peripheral annular band forming a second receiving face, said assembly device comprising a plurality of pressing sub-assemblies that are each assigned to fastening a separate spoke and each comprise at least one pusher arranged to press one of the first and second feet of the spoke in question against the receiving face of the hub or the peripheral annular band respectively that corresponds to said foot of the spoke, said assembly device being characterized in that each of said pressing sub-assemblies comprises at least one traveller that is mounted radially movably relative to the central axis, under the control of a drive system, and that holds a lever that extends radially from an anchor point, via which said lever is rigidly connected to the traveller, to a bearing member that is situated axially at a distance from the anchor point along the central axis, and via which said lever bears against said pusher in a contact area that is situated on the back of said pusher, radially opposite the foot and the receiving face, and also that is contained in the axial range occupied by the foot in question along the central axis, so that, when the drive system radially moves the traveller, the lever rigidly connected to said traveller transmits to the pusher, by means of the bearing member, a clamping force that presses said pusher, and therefore the foot of the spoke, against the receiving face, and also provides, like a spring, through the elastic bending capacity of said lever, elastic radial suspension of the pusher vis-à-vis the traveller and therefore against the foot of the spoke and the receiving face.

Advantageously, the arrangement proposed by the invention firstly makes it possible, due to the multiple pressing sub-assemblies, to act simultaneously on several spokes, preferably on all of the spokes, in order to achieve assembly, and in particular assembly by bonding, in a very short time, typically in a single step, while nonetheless benefiting from individual management of the pushers, because the radial travel of each traveller is individually controlled.

Next, the lever that provides the link between each traveller and the corresponding pusher advantageously makes it possible to convert the imposed radial movement of the traveller into a radial force that is exerted against the foot of the spoke, the radial movement of which is limited and stopped by the corresponding receiving face of the hub or the peripheral annular band respectively. Insofar as the receiving face resists the movement of the foot of the spoke, and therefore the movement of the pusher, this radial force generated by the movement of the traveller results in a clamping force, that is, a radial compressive force that the pusher exerts on the foot of the spoke against the receiving face, and which therefore presses the foot of the spoke against said receiving face.

Particularly advantageously, like a leaf spring, the lever imparts the required flexibility to allow the pressing sub-assembly to adjust the clamping force. The stiffness of said lever, here more particularly the bending stiffness of said lever, and the value of the radial movement imposed on the traveller, make it possible define the intensity of the clamping force, and more particularly to select a predetermined range of intensity of the clamping force, so that the radial compressive force that the pusher will actually exert on the foot of the spoke against the receiving face is controlled quite precisely.

Each pressing sub-assembly is thus capable of adapting to the specific configuration of each pusher and each foot, linked in particular to the dimensional manufacturing tolerances of these parts, and of accommodating, if applicable, the thermal expansion when a curing phase of the tyre is envisaged in order to seal the spokes to the receiving faces of the hub and the peripheral annular band.

Further, the use of a lever that makes it possible to place the bearing member axially at a distance from the body of the traveller makes it possible to position said traveller at an axial distance from the pusher and from the foot of the spoke, in a region of space that does not interfere with the region occupied by the pusher and the spoke.

Said traveller and its guide and drive system can thus be sized so as to guarantee accurate, robust and powerful driving of said traveller, all while still making it possible to locate the application point of the radial compressive force that the lever exerts on the pusher in a contact area that is substantially axially centred relative to the foot of the spoke to be compressed, and that is therefore situated in this instance substantially in the equatorial plane of the tyre, so that any accidental tilting and any jamming of the pusher by butting during the radial movement of said pusher is prevented, and so that said pusher acts as a spreader that substantially uniformly distributes the radial compressive force over the whole axial extent of the foot of the spoke, which guarantees high quality fastening.

Additionally, the invention makes it possible to produce compact pressing sub-assemblies made up of a small number of parts and therefore particularly robust and reliable.

Finally, the relative simplicity of the structure of the assembly device according to the invention, and therefore its relative lightness, make it possible to limit the thermal inertia of said device, which improves the cycle time when such time comprises, while the pushers hold the feet of the spokes pressed against the hub and/or against the peripheral annular band, a heating phase for sealing the spokes to the hub and the peripheral annular band by bonding.

Further objects, features and advantages of the invention will become apparent in more detail on reading the following description and with the aid of the appended drawings, which are provided purely by way of non-limiting illustration, in which:

BRIEF DESCRIPTION OF THE FIGURES

FIG. 1 is a perspective view of an airless tyre assembled by a device according to the invention.

FIG. 2 illustrates, in a perspective view, a spoke of the tyre in FIG. 1.

FIG. 3 shows, in a cross-sectional perspective view in a radial plane containing the central axis, an assembly device according to the invention.

DETAILED DESCRIPTION

Figure 4:
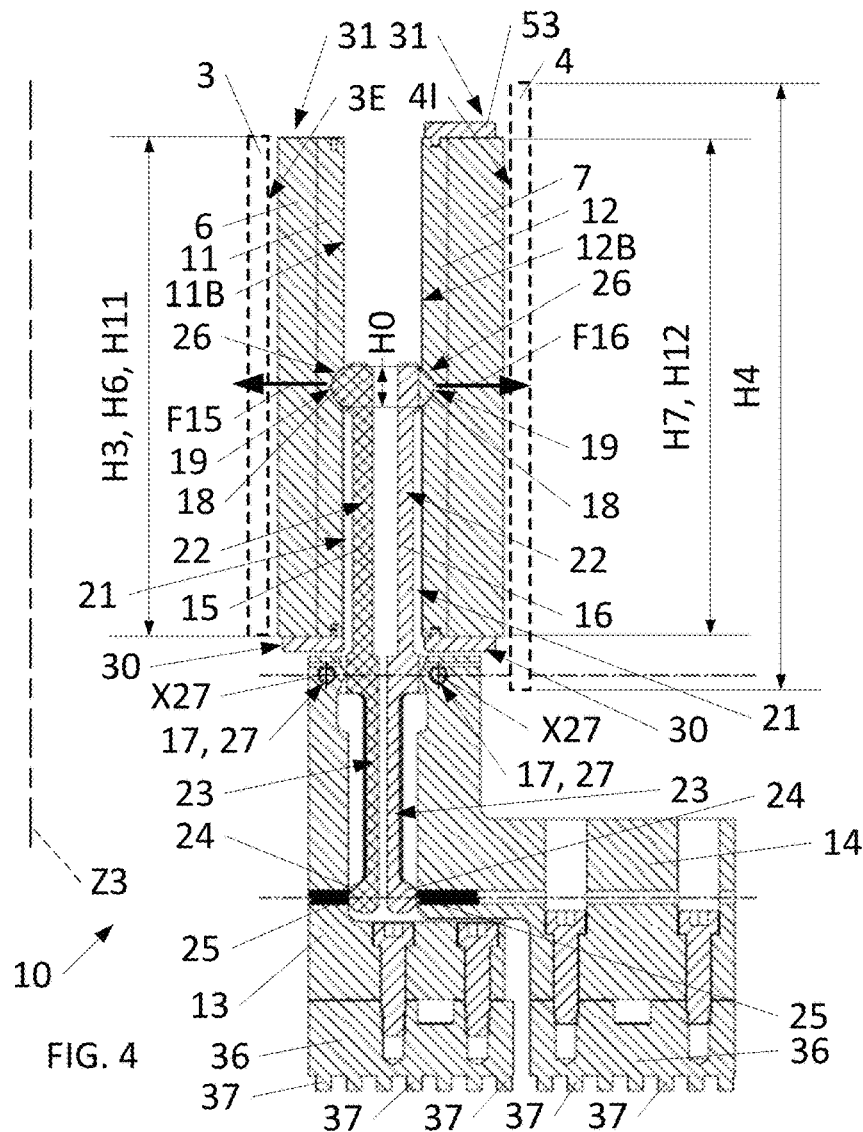
FIG. 4 shows, in a detailed cross-sectional view in a radial plane containing the central axis, a pressing sub-assembly used in the device in FIG. 2.

The present invention relates to an assembly device 1 for manufacturing a tyre 2.

Said tyre 2 is suitable for being fitted on a vehicle wheel.

Said tyre 2 comprises a hub 3 having a central axis Z3, a peripheral annular band 4 coaxial with the hub 3, and a plurality of spokes 5 that connect the hub 3 to the peripheral annular band 4, as illustrated in FIG. 1.

The spokes 5 advantageously make it possible to mechanically support the peripheral annular band 4 relative to the hub 3, without the need to provide a pneumatic chamber for receiving a pressurized inflation gas. The tyre 2 is thus preferably a so-called "airless" tyre.

Here, "peripheral annular band" 4 very generally denotes the annular structure of the tyre 2, which is held by the spokes 5 and forms the tread for coming into contact with the road. Said peripheral annular band 4 can thus preferably have, in a manner known per se, a laminated structure that comprises a radially inner reinforcing crown, containing one or more layers containing reinforcing threads or reinforcing fibres embedded in a resin and/or in a rubber-based material, and then a radially outer layer containing one or more rubber-based materials, which forms the tread of the tyre 2.

The hub 3 is a rigid, or semi-rigid, circular ring, for example made from a metal alloy or a composite material, which can be designed to be mounted on a rim, or to form a rim in itself capable of being mounted directly on a vehicle axle or wheel shaft.

Hereinafter, the terms "axial" and "axially" refer to directions that are parallel to the central axis Z3, while the terms "radial" and "radially" refer to directions that are perpendicular to said central axis Z3.

Each of the spokes 5 comprises, as can be seen in FIGS. 1 and 2, a first foot 6 that is fastened to a radially outer face 3E of the hub 3, which forms a first receiving face 3E, and a second foot 7 that is fastened to a radially inner face 4I of the peripheral annular band 4 forming a second receiving face 4I.

Here, the radially outer face 3E of the hub 3, which forms the first receiving face 3E, is a convex cylindrical face with a circular base centred on the central axis Z3.

Likewise, the radially inner face 4I of the peripheral annular band 4 forming the second receiving face 4I, is a concave cylindrical face with a circular base centred on the central axis Z3.

The diameter of the first receiving face 3E belonging to the hub 3 is of course strictly smaller than the diameter of the second receiving face 4I belonging to the peripheral annular band 4, the difference being filled by the spokes 5.

The diameter of the hub 3, and more particularly the diameter of the radially outer face 3E of said hub on which the spokes 5 rest, can be between 30 cm and 60 cm.

The overall outer diameter of the peripheral annular band 4 can be between 50 cm and 90 cm, and the overall width of said peripheral annular band, taken along the central axis Z3, can be between 100 mm and 400 mm.

More preferably, the hub 3 can form a rim or be mounted on a rim that has dimensions that correspond to the standardized sizes of the 12-inch to 24-inch rims used for usual pneumatic tyres. Likewise, the tyre 2 can more generally have dimensions, and in particular an overall diameter and an axial width, that correspond to the standardized sizes of the pneumatic tyres suitable for rims with the aforementioned standardized dimensions.

The spokes 5, and more particularly the feet 6, 7 thereof, are preferably made from a rubber-based material. The spokes also preferably contain reinforcing elements, based on reinforcing threads or composite structures comprising reinforcing fibres, in order to ensure the mechanical strength of said spokes 5 vis-à-vis radial compression.

Preferably, as can be seen in FIG. 2, the first foot 6 is connected to the second foot 7 by a V-shaped central portion 8 of the spoke, in order to impart controlled flexibility to the spoke 5 allowing said spoke to elastically accommodate the deformations of the tyre 2 during running and to ensure a degree of damped elastic suspension of the hub 3, and therefore of the vehicle, relative to the peripheral annular band 4. This makes it possible in particular to provide a degree of running comfort, which can be close to that obtained with usual pneumatic tyres.

According to the invention, the assembly device 1 comprises a plurality of pressing sub-assemblies 10 that are each assigned to fastening a separate spoke 5.

Preferably, the assembly device 1 comprises as many pressing sub-assemblies 10 distributed about the central axis Z3 as there are spokes 5 in the tyre 2.

All of the spokes 5 can thus be fastened simultaneously to the hub 3 or the peripheral annular band 4 respectively, in a single manufacturing step, which minimizes the manufacturing cycle time, while still benefiting from individualized management of each spoke 5.

The spokes 5, and as a result the associated pressing sub-assemblies 10, are preferably evenly distributed azimuthally about the central axis Z3.

For the sake of standardization, the spokes 5 are preferably all identical to each other.

The same preferably applies to the pressing sub-assemblies 10, which are duplicated identically to each other so as to form interchangeable modules.

By way of indication, between 30 and 80 spokes 5 can be provided, for example 64 spokes 5, and therefore as many pressing sub-assemblies 10, in particular for a hub 3 the diameter of which corresponds to the diameter of a 12-inch to 24-inch rim.

Figure 5:
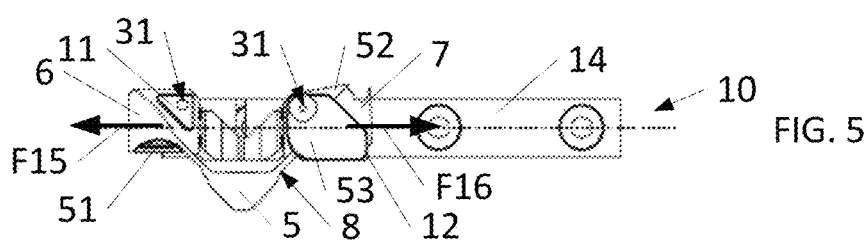
FIG. 5 shows, in a top view projected in a plane normal to the central axis, the interaction between the pressing sub-assembly in FIG. 4 and the spoke that is subjected to the action of said sub-assembly.

As can be seen in particular in FIGS. 3, 4 and 5, the pressing sub-assemblies 10 each comprise at least one pusher 11, 12 arranged to press one of the first and second feet 6, 7 of the spoke 5 in question against the receiving face 3E, 4I of the hub 3 or the peripheral annular band 4 respectively that corresponds to said foot 6, 7 of the spoke 5.

The pushers 11, 12 are preferably formed by straight, rigid bars, preferably metal.

Said pushers 11, 12 preferably extend parallel to the central axis Z3, over a length preferably at least equal to at least 30%, preferably at least equal to 50%, or even 70%, of the axial length of the feet 6, 7, in order to be correctly seated against said feet 6, 7.

Preferably, the axial length of each pusher 11, 12 and more particularly the axial length of the radially inner first pusher 11, does not exceed the axial length of the corresponding foot 6, 7. This makes it possible to prevent any interference between the pusher 11, 12 and the corresponding receiving face 3E, 4I, in particular here between the first pusher 11 and the receiving face 3E of the hub 3. It also makes it possible to make a single pressing assembly 10, and more generally a single device 1, compatible with the assembly of a plurality of dimensions of spokes 5, and more generally with the assembly of a plurality of axial dimensions of tyres 2.

The pushers 11, 12 preferably have a transverse cross-section having a shape conjugate to the shape of the corresponding feet 6, 7, here for example a substantially triangular cross-section one side of which follows the slope of the arm of the V-shaped central portion 8 of the spoke 5, as well as the face of the foot that forms the continuation of said slope, as can be seen in FIG. 5.

As can be seen in FIG. 5, each pusher 11, 12 can advantageously be associated with a flange 51, 52 that is secured to said pusher 11, 12 by one or more connectors 53 and allows the pusher 11, 12 to ensure a grip on the foot 6, 7 on each side of the arm that attaches said foot to the central portion 8 of the spoke 5, so as to prevent any tilting or loss of control of the trajectory of the foot 6, 7 during the radial movement of the pusher 11, 12.

According to the invention, each of the pressing sub-assemblies 10 comprises at least one traveller 13, 14 that is mounted radially movably relative to the central axis Z3, under the control of a drive system 20, and that holds a lever 15, 16 that extends radially from an anchor point 17, via which said lever 15, 16 is rigidly connected to the traveller 13, 10) 14, to a bearing member 18 that is situated axially at a distance from the anchor point 17 along the central axis Z3, and via which said lever 15, 16 bears against said pusher 11, 12 in a contact area 19 that is situated on the back 11B, 12B of said pusher 11, 12, radially opposite the foot 6, 7 and the receiving face 3E, 4I, and that is also contained in the axial range H6, H7 occupied by the foot 6, 7 in question along the central axis Z3, so that, when the drive system 20 radially moves the traveller 13, 14, the lever 15, 16 carried by said traveller 13, 14 transmits to the pusher 11, 12, by means of the bearing member 18, a clamping force F15, F16 that presses said pusher 11, 12, and therefore the foot 6, 7 of the spoke 5, against the receiving face 3E, 4I, and also provides, like a spring, through the elastic bending capacity of said lever 15, 16, elastic radial suspension of the pusher 11, 12 vis-à-vis the traveller 13, 14 and therefore against the foot 6, 7 of the spoke 5 and the receiving face 3E, 4I.

As stated above, the flexibility provided by the lever 15, 16, which acts like a spring interposed between the traveller 13, 14 and the pusher 11, 12, allows each pusher 11, 12 to adapt its radial movement on a case-by-case basis and adjust the intensity of the clamping force F15, F16 that said pusher 11, 12 applies to the foot 6, 7 of the spoke as a function of the arrangement and reactions of the spoke 5 in question and of the corresponding receiving face 3E, 4I.

This ensures in particular that the foot 6, 7 of each of the spokes 5, which is gripped and radially compressed between the pusher 11, 12 and the receiving face 3E, 4I, is suitably positioned and is subject to a clamping force F15, F16 that is sufficiently strong to guarantee satisfactory adhesion of said foot 6, 7 on the receiving face 3E, 4I, but without however exceeding an intensity threshold that would be damaging for the spoke 5 or said receiving face 3E, 4I.

"Axial range" or "axial extent" of an element, here for example the axial range H6, H7 of the foot 6, 7 of the spoke, denotes the extent, along the central axis Z3, between two fictitious planes that are normal to said central axis Z3 and tangent to the axial ends of the element in question. In an equivalent manner, "axial range" thus denotes the segment of the central axis Z3 that corresponds to the orthogonal projection of the element in question on said central axis Z3.

It will be noted that, in order to be correctly seated on the hub 3 and effectively support the peripheral annular band 4, the spokes 5, and more particularly the feet 6, 7 of said spokes 5, preferably have an axial extent H6, H7 representing between 70% and 105% of the axial extent H3 of the hub 3 and/or, alternatively or in addition to the preceding criterion, between 70% and 100% of the axial extent H4 of the peripheral annular band 4.

"Back" 11B, 12B of the pusher 11, 12 denotes a face of the pusher that is situated radially opposite the "front" face of said pusher 11, 12 by which said pusher 11, 12 presses against the foot 6, 7 and can thus compress the foot 6, 7 against the receiving face 3E, 4I.

Advantageously, insofar as the bearing member 18 of the lever 15, 16 acts on the back 11B, 12B of the pusher 11, 12 in an axial position that is situated facing the axial range H6, H7 occupied by the foot 6, 7 of the spoke, and more preferably insofar as the bearing member 18 of the lever 15, 16 acts on the back 11B, 12B of the pusher in an axial position that is substantially centred on the axial range H6, H7 occupied by the foot 6,7, then the pusher 11, 12 is particularly stable and the clamping force is evenly distributed by said pusher 11, 12 over the whole axial range H6, H7 of the foot 6, 7.

For the sake of compactness and design, the lever 15, 16 is preferably in the form of a rod or blade forming an antenna protruding axially relative to the traveller 13, 14, and more particularly relative to the anchor point 17, and the longitudinal direction of which is preferably substantially parallel to the central axis Z3, and more particularly the angular deviation from said central axis Z3 of which is less than or equal to 10 degrees, or even less than or equal to 5 degrees, both initially and during the radial movements of the traveller 13, 14.

The shape and material forming the lever 15, 16 are of course selected so as to impart the appropriate mechanical strength and bending stiffness to the lever.

By way of indication, the lever 15, 16 can be made from steel having appropriate elastic properties, for example silicon steel, or from a composite material for example based on carbon fibres impregnated with an epoxy resin. The shape and thinness of said materials are selected to impart the required bending flexibility and stiffness on said lever 15, 16.

A radial gap 21 is provided between the back 11B, 12B of the pusher 11, 12 and the body of the lever 15, 16, contained between the anchor point 17 and the bearing member 18, so as to permit the tilting and bending movements of said lever 15, 16 while preventing any interference of said lever 15, 16 with the back 11B, 12B of the pusher, except of course the intentional contact between the bearing member 18 and the back 11B, 12B of the pusher that occurs in the contact area 19 provided to this end.

As such, the bearing member 18 preferably forms a protrusion that extends protruding radially relative to the body of the lever 15, 16, towards the back 11B, 12B of the pusher 11, 12, so that the body of the lever 15, 16 can remain away from the back 11B, 12B of the pusher when said bearing member 18 is in contact with said back 11B, 12B of the pusher.

In absolute terms, it can be envisaged that the lever 15, 16 is fastened to the back 11B, 12B of the pusher, or even integrally formed with the pusher 11, 12, at the bearing point 18, and connected to the traveller 13, 14 by the anchor point 17, provided that the arrangement of the lever 15, 16 makes it possible to perform the functions of transmitting radial clamping force F15, F16 and elastic suspension.

However, preferably, and in particular in order to simplify the manufacturing of the pushers 11, 12, the lever 15, 16 is separate from the pusher 11, 12.

Figure 6:
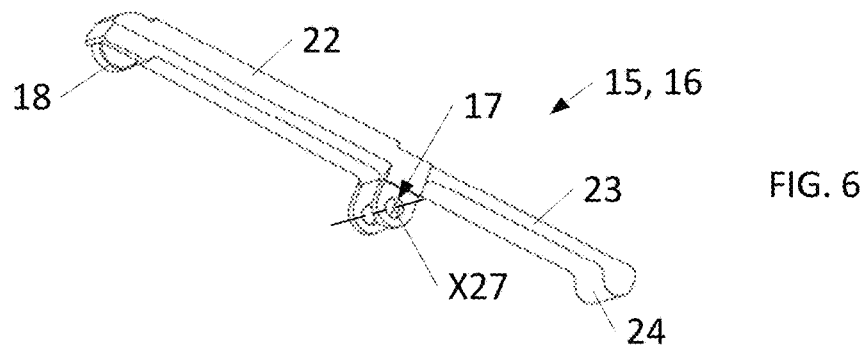
FIG. 6 shows, in a perspective view, a lever used by the pressing sub-assemblies present in FIGS. 3 and 4.

Preferably, and as can be seen in particular in FIGS. 3, 4 and 6, the bearing member 18 has, in a radial plane containing the central axis Z3, a rounded profile, preferably arc-shaped, that allows said bearing member 18 to roll on the back 11B, 12B of the pusher 11, 12, in order to accommodate the variations in orientation of the lever 15, 16 relative to the back 11B, 12B of the pusher when the lever 15, 16 tilts and/or deforms in bending.

The bearing member 18 can be formed for example by a roller mounted on the body of the lever, or by a shoe that is fastened to the lever 15, 16, or even integrally formed with the body of the lever 15, 16.

The back 11B, 12B of the pusher can preferably have a recess 26 forming a curved cradle, here concave, for receiving the bearing member 18, here convex, as illustrated in FIG. 4, which makes it possible in particular to distribute the contact area 19 more easily over a relatively large sector of the rounded profile of the bearing member 18 and of said cradle 26, and therefore to transmit a relatively strong clamping force F15, F16 to the pusher 11, 12 without damaging or fatiguing the lever 15, 16 or the pusher 11, 12.

In absolute terms, it can be envisaged that the anchor point 17 forms an inset, which eliminates any degree of freedom between the lever 15, 16 and the traveller 13, 14. The displacements of the lever 15, 16 necessary for the elastic suspension of the pusher 11, 12 are then provided solely by the deformation of the lever.

However, preferably, and as can be seen in FIGS. 3, 4 and 6, the anchor point 17 is formed by a pivot connection 27, the axis X27 of which is orthoradial relative to the central axis Z3.

"Orthoradial" denotes a direction that is both perpendicular to a radius originating from the central axis Z3 and contained in a plane normal to said central axis Z3, that is, in an equivalent manner, a direction that is normal to a radial plane that contains the central axis Z3 (and passes through the point in question).

Advantageously, the use of a pivot connection 27 at the anchor point 17, here in a fixed position on the traveller 13, 14, allows the lever 15, 16 to tilt freely relative to the traveller 13, 14 and thus to follow the elastic bending, preventing an excessive concentration of stresses at the anchor point 17.

Another advantage of the pivot connection 27 is that it allows the use of a lever 15, 16 that preferably comprises a first branch 22 that extends on one side relative to the axis X27 of the pivot connection 27, in order to connect the anchor point 17 to the bearing member 18, and a second branch 23 that extends on the opposite side relative to the axis X27 of the pivot connection 27, in order to connect the anchor point 17 to a stop member 24 arranged to bear against the traveller 13, 14.

The lever 15, 16 can thus take the form of a rocker.

The second branch 23 can advantageously contribute, due to its intrinsic flexibility, to the spring effect of the lever 15, 16.

As such, provision can optionally be made for the second branch 23 to have a lower quadratic modulus than the first branch 22, and therefore less bending resistance than the first branch 22, so that the elastic deformation ensuring the suspension of the pusher 11, 12 is mainly borne by said second branch 23.

By making the second branch 23, here the lower branch in FIGS. 3 and 4, mainly bear the bending deformation of the lever 15, 16, that is, by selecting a relatively flexible second branch 23, while a relatively stiff first branch 22 is retained that therefore undergoes little bending deformation, it is possible to impart relatively little apparent radial stiffness to the lever 15, 16, due to the flexibility of the second branch 23, and therefore to impart satisfactory flexibility to the elastic radial suspension of the pusher 11, 12, and also to provide relatively large radial travel for the first branch 22, here the upper branch, which undergoes little deformation, and therefore for the traveller 13, 14, without the risk of the first branch 22 deforming excessively to the point that it interferes with the lower base of the pusher 11, 12 during the radial movements of the traveller 13, 14.

The selection of the ratio between the length of the lever arm provided by the second branch 23 between the axis X27 of the pivot connection 27 and the stop member 24, and the length of the lever arm provided by the first branch 22 between said axis X27 of the pivot connection 27 and the bearing member 18, makes it possible to set the conditions for the transmission of force and transmission of angular travel between the stop member 24 and the bearing member 18.

Preferably, the stop member 24 bears against an adjustable stop 25 such as a screw needle, which is held by the traveller 13, 14.

Such an adjustable stop 25 advantageously makes it possible to adjust the tilting end position of the lever 15, 16 and as a result the initial inclination of the lever 15, 16 and/or the potential prestressing of the bearing member 18 against the pusher 11, 12. Adjusting the initial inclination of the lever 15, 16 makes it possible in particular to anticipate and prevent any interference of the lever 15, 16 with the lower base of the pusher 11, 12 during the radial movement of the traveller 13, 14.

Preferably, the contact area 19 that exists between the bearing member 18 of the lever 15, 16 and the back 11B, 12B of the pusher is strictly contained in an axial range H0 referred to as the "central axial range" H0 that is centred on the axial range H11, H12 occupied by the pusher 11, 12 and the axial extent of which represents less than 40%, preferably less than 20%, or even less than 15% of the extent of said axial range H11, H12 occupied by the pusher 11, 12.

The contact area 19, situated at a distance from the anchor point 17, thus occupies a relatively small axial extent that is, and remains during the radial movements of the traveller 13, 14 and the pusher 11, 12, contained in the central axial range H0 and therefore, especially, that is and remains substantially centred on the axial range H11, H12 occupied by the pusher 11, 12 and therefore substantially centred on the axial range H6, H7 that is occupied by the foot 6, 7 when said pusher 11, 12 acts on the foot 6, 7 to apply the clamping force F15, F16.

By applying the clamping force F15, F16 substantially in the middle of the pusher 11, 12, that is substantially half way along the length of said pusher 11, 12, the lever 15, 16 makes it possible to stress the pusher 11, 12, and therefore the foot 6, 7 of the spoke, in a relatively balanced manner, and to radially move the pusher 11, 12 without causing any pronounced tilting of said pusher 11, 12 relative to the central axis Z3 or any jamming of said pusher 11, 12 by butting.

Preferably, the pusher 11, 12 is radially guided by a first guide 30 situated at a first axial end of said pusher 11, 12 and by a second guide 31 that is separate from the first guide and situated at a second axial end of said pusher 11, 12 opposite the first end, so that the contact area 19 between the bearing member 18 and the back 11B, 12B of the pusher is situated between said first and second guides 30, 31, at a distance from said guides 30, 31, preferably equidistant from said guides 30, 31.

Advantageously, such double guiding, by guides 30, 31 that are situated axially on either side of the contact area 19, and therefore on either side of the point of application of the clamping force F15, F16 at which the bearing member 18 of the lever acts on the pusher 11, 12, advantageously provides accurate, stable guiding that prevents any tilting or jamming of the pusher 11, 12 by butting during the radial movements of said pusher 11, 12, even though the force supplied by the lever 15, 16 is located in a narrow contact area 19.

By way of example, the first guide 30 and the second guide 31 can comprise fingers that protrude axially at the ends of the pusher 11, 12, more particularly on the connectors 53 that fasten the flanges 51, 52 on the pushers 11, 12, said fingers then being guided in substantially radial grooves provided in first and second annular plates (not shown) that are centred on the central axis Z3 and extend along planes normal to the central axis Z3, axially on either side of the pushers 11, 12.

Preferably, the pusher 11, 12 is moved by a single lever 15, 16 the anchor point 17 of which is situated axially outside the axial range H11, H12 occupied by the pusher 11, 12.

It will be noted in this regard that the anchor point of the lever 15, 16 advantageously remains, during the radial movements of the travellers 13, 14, of the pusher 11, 12, and therefore of the lever 15, 16, situated outside the axial range H11, H12 occupied by the pusher 11, 12.

More generally, the corresponding traveller 13, 14 is, and remains, preferably situated axially outside the axial range H11, H12 occupied by the pusher 11, 12, here below said axial range H11, H12 occupied by the pusher 11, 12 in FIGS. 3 and 4.

Likewise, the anchor point 17, and the corresponding traveller 13, 14, are and remain situated axially outside the axial range H6, H7 occupied by the foot 6, 7, here preferably below said axial range.

As a result, the arrangement according to the invention advantageously makes it possible to offset the traveller 13, 14, and more generally the drive system 20, axially beyond the pushers 11, 12 and the feet 6, 7, or even preferably to group on a single side of the pushers 11, 12, in the axial direction, the different travellers 13, 14 of a single pressing sub-assembly 10, and more preferably the different travellers 13, 14 of all of the pressing sub-assemblies 10, preferably as well as the drive system 20. The travellers 13, 14 and the drive system can thus preferably be positioned below the zone occupied by the pushers 11, 12 and by the hub 3, as well as the peripheral annular band 4.

The assembly device 1 thus has satisfactory compactness and low thermal inertia, while the drive system 20 requires a relatively small number of parts and motors to drive all of the pressing sub-assemblies 10.

Preferably, at least some, and preferably all, of the pressing sub-assemblies 10 each comprise, as can be seen in FIGS. 3 and 4, a first traveller 13 that holds a first lever 15 that bears against the back 11B of a first pusher 11 arranged to press the first foot 6 of the spoke 5 in question against the hub 3, and a second traveller 14 that holds a second lever 16 that bears against the back 12B of a second pusher 12 arranged to press the second foot 6 of said spoke 5 against the peripheral annular band 4.

Each pressing sub-assembly 10 thus preferably comprises a pair of opposing pushers 11, 12 and a corresponding pair of opposing travellers 13, 14, to be able to manage the two feet 6, 7 of a single spoke 5, that is, all of the feet 6, 7 of a single spoke 5, and thus be able to ensure the fastening of the spoke 5 to both the hub 3 and the peripheral annular band 4.

This provides great stability and satisfactory efficiency to the pressing sub-assemblies 10 and more generally to the device 1.

Advantageously, the first and second levers 15, 16, and more particularly the first branches 22 of said first and second levers, as well as the corresponding radial gaps 21, extend in the free space radially contained between the back 11B, 12B of the two pushers 11, 12 as can be seen clearly in FIG. 4.

The first and second travellers 13, 14 of a single pressing sub-assembly 10, and more generally all of the travellers 13, 14 of all of the pressing sub-assemblies 10, are preferably situated axially on a single side relative to the pushers 11, 12 in order to simplify the structure of the drive system 20 and reduce the footprint thereof.

Preferably, the first traveller 13 and the second traveller 14 of a single pressing sub-assembly 10 are radially aligned with each other, and thus occupy a single angular sector azimuthally about the central axis Z3, as can be seen in FIGS. 3, 4, 7 and 10. The same applies to the levers 15, 16 carried by said travellers 13, 14.

The radial forces exerted by said travellers 13, 14 on a single spoke 5 are thus preferably substantially aligned, which in particular prevents the creation of yaw torque that would tend to deform the spoke 5 by twisting or change the orientation of the spoke 5, and therefore the position of the feet 6, 7, by yaw rotation about the axial direction of extension of said spoke 5.

Preferably, the drive system 20 is designed so as to allow the selective generation of either a simultaneous movement of the first traveller 13 and the second traveller 14 against the first foot 6 of the spoke 5 and the second foot 7 of the spoke 5 respectively, or a separate movement of said first and second travellers 13, 14 one after the other.

A simultaneous movement makes it possible in particular to balance the radial extension forces to which the spoke 5 is subject and to achieve the fastening of the two feet 6, 7 in a single step, which makes it possible to minimize the manufacturing cycle time of the tyre 2.

In some circumstances, a separate movement in time can however be preferable. This could for example be the case when the two feet 6, 7 of a single spoke 5 have a very different geometry and/or stiffness from each other and therefore require different preloading to satisfactorily reach their contact point with their respective receiving face 3E, 4I.

It will be noted that in any event, that is, whether the two feet 6, 7 of each spoke 5 are pressed simultaneously or one after the other against the hub 3 and against the peripheral annular band 4 respectively, the receiving face 3E of the hub 3 and the receiving face 4I of the peripheral annular band 4 can respectively be coated in advance with adhesive, for example a two-component polyurethane adhesive, before pressing the feet 6, 7 against said receiving faces, and a curing operation to cure the adhesive can then be carried out while continuing to compress said feet 6, 7 radially against said receiving faces 3E, 4I. Advantageously, the simultaneous fastening of the two feet 6, 7 makes it possible to carry out a single curing step instead of two successive curing steps.

The drive system 20 preferably comprises a motor, or more preferably two motors, for example electric motors, that make it possible to generate the radial movement of the travellers 13, 14. These motors are preferably controlled by an electronic control unit, making it possible to select between simultaneous movements and separate movements.

It will be noted that, in particular in order to be able to implement a compact lever structure that operates reliably in a restricted space, the drive system 20 is preferably arranged to move the traveller 13, 14 and exert a radial tensile force on said traveller, in the same direction as the direction in which the corresponding pusher 11, 12 presses the foot 6, 7 of the spoke 5 against the receiving face 3E, 4I. The radially inner first traveller 13, which acts on the first foot 6 to exert a centripetal radial clamping force F15, will thus be stressed and moved by the drive system 20 in a centripetal radial direction. Conversely, the second traveller 14, which acts on the second foot 7 to exert a centrifugal radial clamping force F16, will be stressed and moved by the drive system 20 in a centrifugal radial direction.

Preferably, the assembly device 1 comprises a shared drive system 20, common to a plurality of the pressing sub-assemblies 10, and preferably common to all of the pressing sub-assemblies 10.

The movements of the travellers 13, 14 can thus be easily controlled by means of a compact, cost-effective drive system 20.

Advantageously, the drive system 20 is preferably designed so that it simultaneously imparts a radial movement of the same amplitude to all of the first travellers 13 that it controls (in particular here a centripetal radial movement). The individual movement of the traveller 13 can thus be fully controlled for each spoke 5, and the simultaneity and uniformity of the radial movement of the first travellers, and therefore of the corresponding first pushers 11 can therefore be guaranteed, and as a result the appropriate positioning and compression of all of the first feet 6 against the hub 3. The undesirable overlapping of said feet 6 can thus in particular be prevented.

Likewise, the drive system 20 is preferably designed so that it simultaneously imparts a radial movement of the same amplitude to all of the second travellers 14 that it controls, in particular here a centrifugal radial movement. This ensures the simultaneity and uniformity of the movement of the second pushers 12 and therefore the appropriate positioning and compression of the second feet 7 against the peripheral annular band 4.

Preferably, said shared drive system 20 comprises a ring 32, 33 that is provided with a spiral guide 34. Said ring 32, 33 is centred on the central axis Z3 and rotatably mounted about the central axis Z3, and interacts with one traveller 13, 14 of each of said pressing sub-assemblies 10 in question in order to convert a rotation of said ring 32, 33 into a radial translation of said traveller 13, 14.

The spiral guide 34 can be formed by a spiral rail protruding axially on a face of the ring 32, 33 that is normal to the central axis Z3 and oriented towards the travellers 13, 14, or by a spiral groove made in the visible surface of said face.

The ring 32, 33 preferably has teeth 32T, 33T on which meshes a pinion driven by one of the aforementioned motors.

Figure 7:
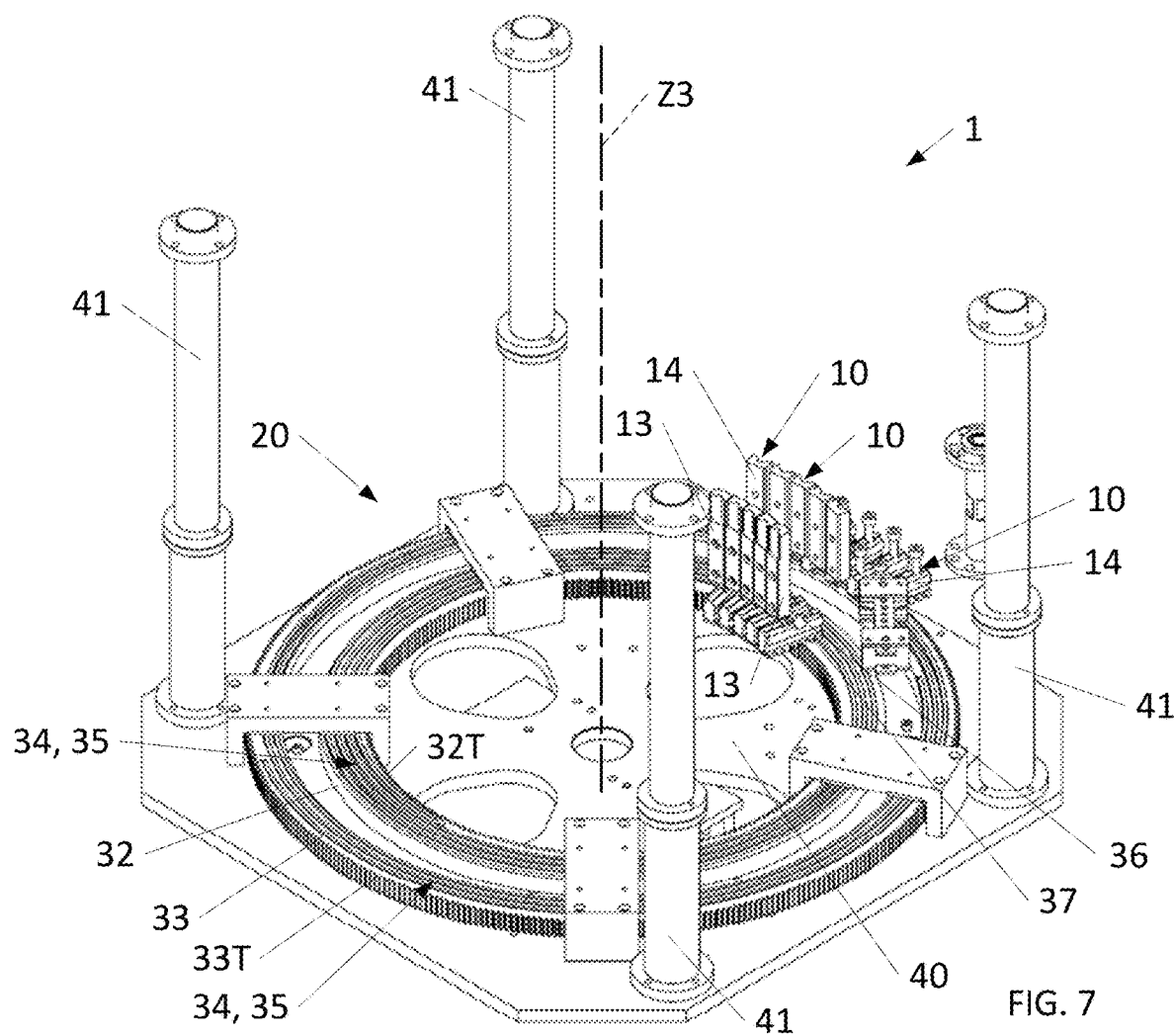
FIG. 7 shows, in a perspective view, the detail of a drive system using spiral guide rings arranged to be rotated about the central axis in order to radially move the travellers of the pressing sub-assemblies of the assembly device in FIG. 3.
Figure 8:
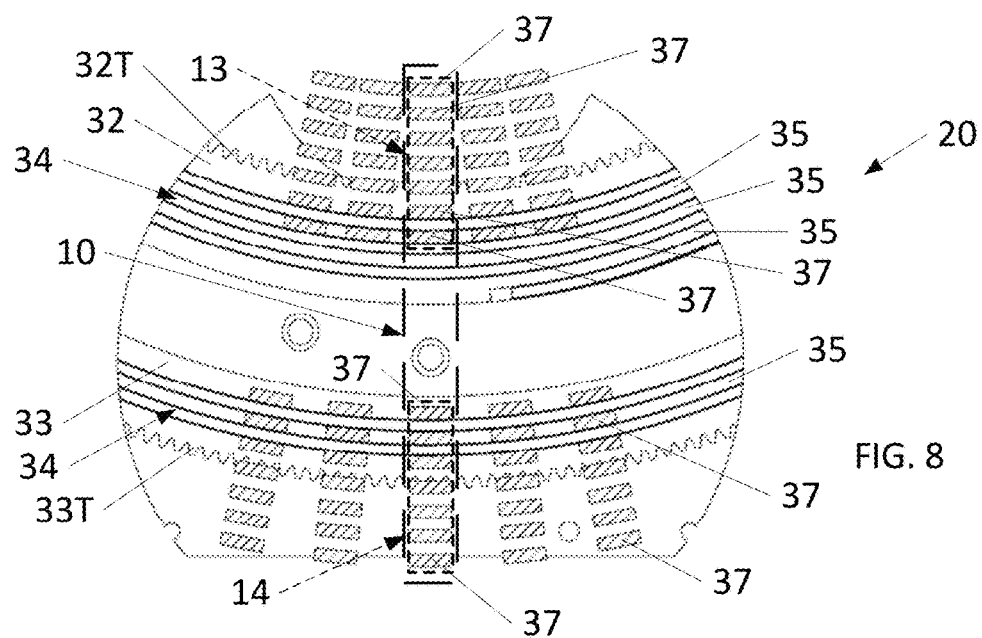
FIG. 8 shows, in a detailed cross-sectional top view, a possible coupling between the travellers and the spiral guide rings of the drive system in FIG. 7, by means of grooves and tongues.

Preferably, and as can be seen in FIGS. 7 and 8, the spiral guide 34 forms a plurality of concentric guide turns 35, and the traveller 13, 14 has a base 36 provided with a plurality of coupling tabs 37 with a shape conjugate to the guide turns 35 and that are radially offset from each other so as to interact with said plurality of concentric guide turns 35.

Advantageously, such a multi-track guide and transmission system, according to which, in a single angular sector about the central axis Z3, the coupling tabs 37 of a single traveller 13, 14 simultaneously engage with a series of portions of radially distributed guide turns 35, makes it possible to achieve particularly robust and stable guiding of the travellers 13, 14 and transmission of force from the ring 32, 33 to the traveller 13, 14.

The concentric guide turns 35 can be formed, as stated above, by male elements such as one or more concentric spiral rails, preferably a single continuous spiral rail that winds over a plurality of revolutions about the central axis Z3, or by female elements such as, according to a particularly preferred embodiment corresponding to the illustrations in FIGS. 6 and 7, one or more grooves that are made in the ring, preferably a single spiral groove that winds over a plurality of revolutions about the central axis Z3.

When the guide turns 35 are formed by one or more female grooves, the coupling tabs preferably take the complementary form of male tongues, as can be seen in FIGS. 4, 7 and 8.

Preferably, the drive system 20 comprises at least one first ring 32 provided with a spiral guide 34, which first ring 32 is rotatably mounted about the central axis Z3 and interacts simultaneously with the first travellers 13 of the different pressing sub-assemblies in question, preferably all of the pressing sub-assemblies 10, to convert a rotation of said first ring 32 into a radial translation of said first travellers 13, and a second ring 33 provided with a spiral guide 34, which second ring 33 is rotatably mounted about the central axis Z3 and coaxial with the first ring 32, and simultaneously interacts with the second travellers 14 of said different pressing sub-assemblies 10 to convert a rotation of said second ring 33 into a radial translation of said second travellers 14.

Preferably, the first ring 32 and the second ring 33 are substantially coplanar, and normal to the central axis Z3, which makes it possible to achieve a very compact drive system 20.

Advantageously, depending on whether the first ring 32, the second ring 33, or both rings 32, 33 are activated, the set of first travellers 13, or the set of second travellers 14, or both sets of travellers 13, 14 simultaneously are respectively moved, and as a result the first feet 6, the second feet 7, or all of the first and second feet 6, 7 of the spokes 5 are respectively pressed against the corresponding receiving surfaces 3E, 4I.

Preferably, as illustrated in FIGS. 3 and 7, the assembly device 1 is arranged so that the central axis Z3 is vertical.

The assembly device 1 can then comprise a base 40 forming a substantially horizontal plate arranged to receive the hub 3, as well as the rings 32, 33, and on which are fastened vertical pillars 41, which make it possible in particular to fasten a first annular plate (not shown) above the base 40 and parallel to said base 40, on a first level, arranged to receive the peripheral annular band 4 and form the first guides 30 guiding the lower axial ends of the pushers 11, 12, which first annular plate is pierced in the middle thereof to leave the space necessary for the hub 3, the spokes 5 and the pressing sub-assemblies 10 to pass through, and then, on an upper level, a second annular plate (not shown), or even a disc-shaped cover, arranged to form the second guides 31 that guide the upper axial ends of the pushers 11, 12.

Of course, the invention is in no way limited to the variant embodiments described above, and a person skilled in the art could particularly isolate or freely combine any of the aforementioned features, or replace them with equivalent features.

The invention claimed is:

1. An assembly device for manufacturing a tire that comprises a hub having a central axis, a peripheral annular band coaxial with the hub, and a plurality of spokes that connect the hub to the peripheral annular band and that each comprise a first foot fastened on a radially outer face of the hub forming a first receiving face and a second foot fastened on a radially inner face of the peripheral annular band forming a second receiving face, the assembly device comprising:

a plurality of pressing sub-assemblies that are each assigned to fastening a separate spoke and each comprise at least one pusher arranged to press one of the first and second feet of a given spoke against the receiving face of the hub or the peripheral annular band respectively that corresponds to the first or second foot of the spoke, wherein each of the pressing sub-assemblies comprises at least one traveller that is mounted radially movably relative to the central axis, under the control of a drive system, and that holds a lever that extends radially from an anchor point, via which the lever is rigidly connected to the traveller, to a bearing member that is situated axially at a distance from the anchor point along the central axis, and via which the lever bears against the pusher in a contact area that is situated on a back of the pusher, radially opposite the foot and the receiving face, and that is also contained in an axial range occupied by the foot along the central axis, so that, when the drive system radially moves the traveller, the lever carried by the traveller transmits to the pusher, by means of the bearing member, a clamping force that presses the pusher, and therefore the foot of the spoke, against the receiving face, and provides through an elastic bending capacity of the lever, elastic radial suspension of the pusher vis-à-vis the traveller and therefore against the foot of the spoke and the receiving face.

2. The assembly device according to claim 1, wherein the lever is separate from the pusher, and wherein the bearing member has, in a radial plane containing the central axis, a rounded profile that allows the bearing member to roll on the back of the pusher, in order to accommodate variations in orientation of the lever relative to the back of the pusher when the lever tilts and/or deforms in bending.

3. The assembly device according to claim 1, wherein the anchor point is formed by a pivot connection, an axis of which is orthoradial relative to the central axis.

4. The assembly device according to claim 3, wherein the lever comprises a first branch that extends on one side relative to the axis of the pivot connection, in order to connect the anchor point to the bearing member, and a second branch that extends on an opposite side relative to the axis of the pivot connection, in order to connect the anchor point to a stop member arranged to bear against the traveller, against an adjustable stop, which is held by the traveller.

5. The assembly device according to claim 1, wherein the contact area that exists between the bearing member of the lever and the back of the pusher is strictly contained in a central axial range that is centered on an axial range occupied by the pusher and an axial extent of which represents less than 40% of an extent of the axial range occupied by the pusher.

6. The assembly device according to claim 1, wherein the pusher is radially guided by a first guide situated at a first axial end of the pusher and by a second guide separate from the first guide and situated at a second axial end of the pusher opposite the first end, so that the contact area between the bearing member and the back of the pusher is situated between the first and second guides, at a distance from the first and second guides.

7. The assembly device according to claim 1, wherein the pusher is moved by a single lever, the anchor point of which is situated axially outside an axial range occupied by the pusher.

8. The assembly device according to claim 1, wherein at least some of the pressing sub-assemblies each comprise a first traveller that holds a first lever that bears against the back of a first pusher arranged to press the first foot of the given spoke against the hub, and a second traveller that holds a second lever that bears against the back of a second pusher arranged to press the second foot of the given spoke against the peripheral annular band.

9. The assembly device according to claim 8, wherein the drive system is designed so as to allow selective generation of either a simultaneous movement of the first traveller and the second traveller against the first foot of the given spoke and the second foot of the given spoke respectively, or a separate movement of the first and second travellers one after the other.

10. The assembly device according to claim 1, wherein the assembly device further comprises a shared drive system, common to a plurality of the pressing sub-assemblies, the shared drive system comprising a ring that is provided with a spiral guide, which is centered on and rotatably mounted about the central axis, and which interacts with a traveller of each of the pressing sub-assemblies in order to convert a rotation of the ring into a radial translation of the traveller.

11. The assembly device according to claim 10, wherein the spiral guide forms a plurality of concentric guide turns, and the traveller has a base provided with a plurality of coupling tabs with a shape conjugate to the guide turns and that are radially offset from each other so as to interact with the plurality of concentric guide turns.

12. The assembly device according to claim 8, wherein the assembly device further comprises a shared drive system, common to a plurality of the pressing sub-assemblies, the shared drive system comprising a ring that is provided with a spiral guide, which is centered on and rotatably mounted about the central axis, and which interacts with a traveller of each of the pressing sub-assemblies in order to convert a rotation of the ring into a radial translation of the traveller, and wherein the drive system comprises at least one first ring provided with a spiral guide, which at least one first ring is rotatably mounted about the central axis and interacts simultaneously with the first travellers of the pressing sub-assemblies, to convert a rotation of the at least one first ring into a radial translation of the first travellers, and a second ring provided with a spiral guide, which second ring is rotatably mounted about the central axis and coaxial with the first ring, and simultaneously interacts with the second travellers of the pressing sub-assemblies to convert a rotation of the second ring into a radial translation of the second travellers.

13. The assembly device according to claim 1, wherein the assembly device comprises as many pressing sub-assemblies distributed about the central axis as there are spokes in the tire.

* * * * *